United States Patent [19]

Shirahama et al.

[11] Patent Number: 5,339,705

[45] Date of Patent: Aug. 23, 1994

[54] SHIFT DEVICE FOR AUTOMATIC TRANSMISSION

[75] Inventors: Katsunori Shirahama; Michihiro Okuda, both of Kanagawa; Atsuo Ohno, Tokyo, all of Japan

[73] Assignee: Nissan Motor Co., Ltd., Yokohama, Japan

[21] Appl. No.: 843,057

[22] Filed: Mar. 2, 1992

[30] Foreign Application Priority Data

Mar. 7, 1991 [JP] Japan .................... 3-41933
Mar. 11, 1991 [JP] Japan .................... 3-44838

[51] Int. Cl.⁵ .................... G05G 5/14; F16H 59/02
[52] U.S. Cl. .................... 74/475; 74/527; 74/538
[58] Field of Search .......... 74/473 R, 475, 473 P, 74/471 XY, 527, 538

[56] References Cited

U.S. PATENT DOCUMENTS

| 4,365,522 | 12/1982 | Kubota et al. | 74/538 X |
| 4,442,730 | 4/1984 | Snoy | 74/475 |
| 4,519,266 | 5/1985 | Reinecke | 74/475 X |
| 4,537,088 | 8/1985 | Kubota | 74/475 X |
| 5,044,221 | 9/1991 | Suzuki et al. | 74/475 |
| 5,156,061 | 10/1992 | Ishizuki et al. | 74/538 X |

FOREIGN PATENT DOCUMENTS

| 417462 | 11/1910 | France | 74/475 |
| 2-3733 | 1/1990 | Japan | 74/475 |
| 2-80844 | 3/1990 | Japan | 74/475 |
| 2-199359 | 8/1990 | Japan | 74/475 |

*Primary Examiner*—Allan D. Herrmann
*Attorney, Agent, or Firm*—Lowe, Price, LeBlanc & Becker

[57] ABSTRACT

A shift device for an automatic transmission of an automobile includes an indicator box affixed to the automobile floor. The indicator box has, in part, a wavy surface and a shift lever which is moved back and forth about an axle by an operator of the automobile. A spring-biased check ball is resiliently held in contact with the wavy surface of the indicator box, and is moved back and forth with respect to the axle in correspondence with motion of the shift lever. The position of the shift lever is regulated by the wavy surface of the indicator box and an indicator is visually provided, so that the shift lever stops accurately at positions of the indicator without needing adjustment during assembly of the selected shift device in a manufacturing assembly line.

8 Claims, 6 Drawing Sheets

SHIFT DEVICE FOR AUTOMATIC TRANSMISSION

FIELD OF THE INVENTION

The present invention relates generally to a shift device for an automatic transmission used in an automobile.

BACKGROUND OF THE PRIOR ART

It is well known in the art that a shift device is provided in an automobile which has an automatic transmission so that a driver can change a shift position of the transmission.

A shift device for an automatic transmission of this kind is disclosed in, for example, U.S. Pat. No. 5,044,221. Such a shift device is shown in FIGS. 12 and 13. The shift device 101 includes a base plate 102 which is fixed to a floor panel (not shown) of the automobile, a position plate 103 which is a steel plate that has steps 104 corresponding to shift positions on the lower side of the plate 103, a shift lever 105 moving pivotably about a support 106 held by base plate 102, a position pin 107 moving up and down along the shaft 108 of the shift lever 105 corresponding to push and release of a knob 109 at the top of shift lever 105, and an indicator box 120 which is made of plastic and which covers the lower part of shift lever 105. Position pin 107 rests on one of steps 104 of position plate 103 after the driver pushes knob 109, moves lever 105, changes the shift position and releases knob 109. As shown in FIG. 12, on the upper face of indicator box 120 is provided a shift position indicator 121 so that it indicates the position in which shift lever 105 is being held.

However, as the position plate 103 and the indicator box 120 are fixed to the base plate 102 respectively in a manufacturing assembly line, it may happen that an error in the relative position between the indicator box 120 and the position plate 103 becomes so large that the shift lever 105 does not rest accurately with respect to the position indicator 121 when the position pin 107 stops at one of the steps 104 of the position plate 103. This problem may be corrected after assembly by repairing position plate 103 or by adjusting the indicator box 120. This, however, is not easy because the seats of the automobile are arranged next to the indicator box 120 on both sides, and there is only limited space left between the indicator box 120 and those seats.

SUMMARY OF THE INVENTION

It is, accordingly, a principal object of the present invention to avoid the disadvantages of the prior art.

According to a preferable embodiment of this invention, there is provided a shift device for an automatic transmission of an automobile which comprises an indicator box fixed to a floor of the automobile, the indicator box having in part a wavy surface having portions at different heights, an axle horizontally extending from side to side being supported by the indicator box, a shift lever movable around the axle under control of the driver of the automobile, and check ball means held resiliently in contact with the wavy surface of the indicator box, the check ball means moving in correspondence with movement of the shift lever.

DESCRIPTION OF THE PREFERRED EMBODIMENT

Figure 1:
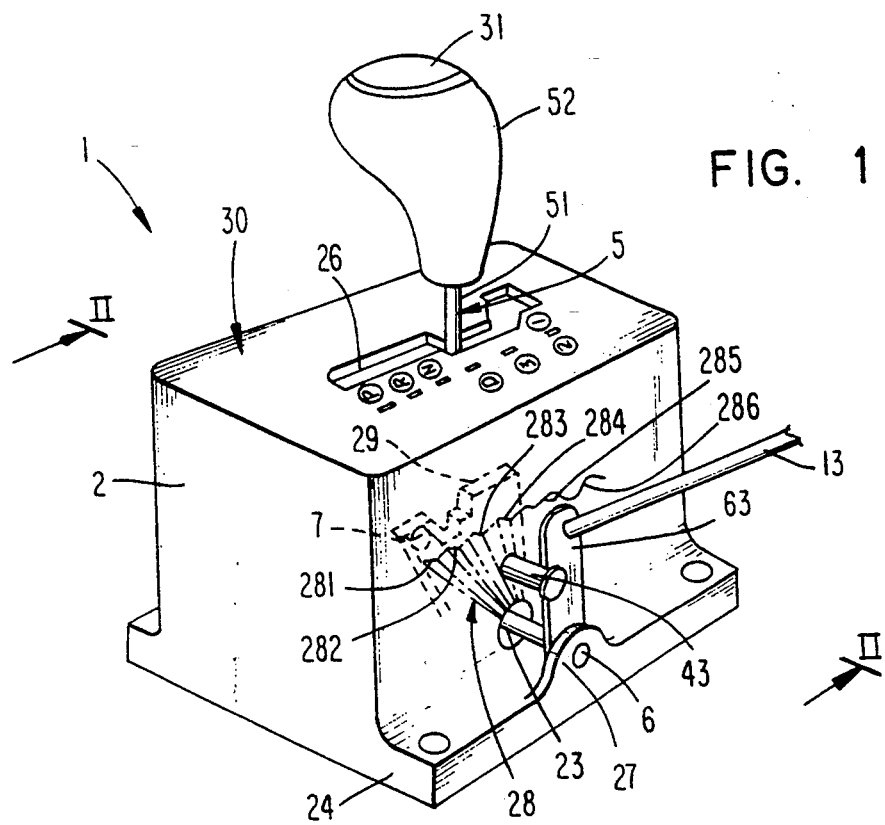
FIG. 1 is a perspective view of a shift device according to the preferred embodiment of the present invention as seen from a front-left position of the shift device.
Figure 2:
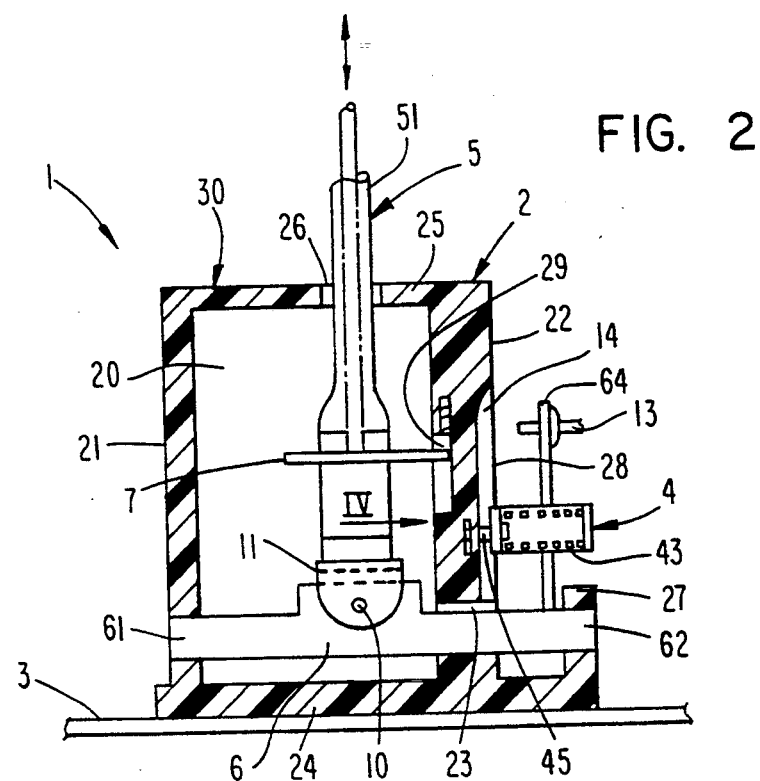
FIG. 2 is a vertical sectional view of the shift device at section line II—II of FIG. 1.
Figure 3:
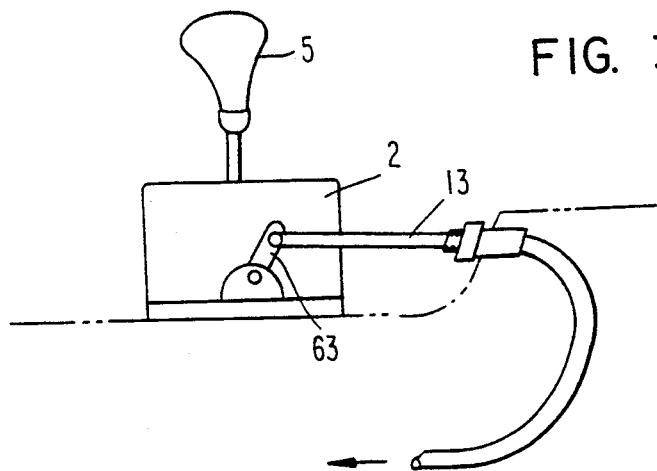
FIG. 3 is a side view of the shift device.
Figure 4:
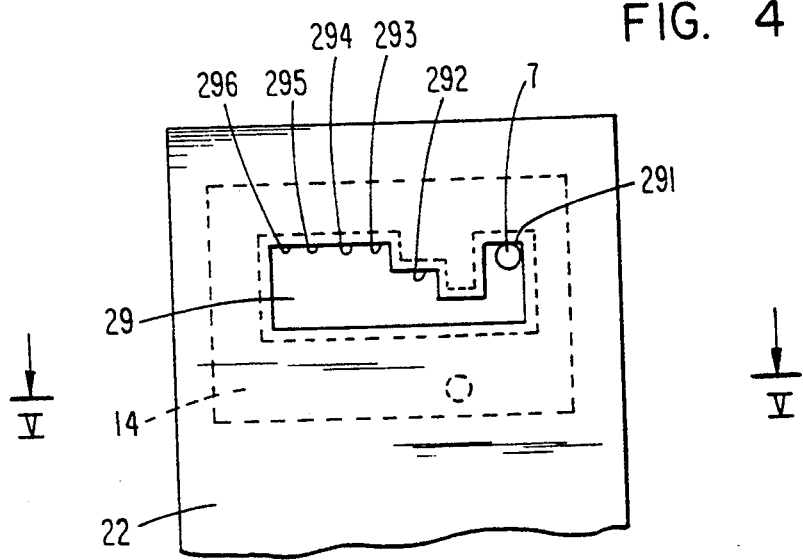
FIG. 4 is a side view of an inside surface of the left wall of the indicator box.

FIGS. 1-6 show the preferred first embodiment of this invention. 1 is a shift device for an automatic transmission. The shift device 1 includes an indicator box 2 which is preferably made of plastic and is fixed to a floor panel 3 of an automobile (not shown) by its base 24. The indicator box 2 has an inner space 20. Inside the inner space 20, there is provided a pivotal support 6 having an axis extending from side to side. One end 61 of pivotal support 6 is supported by the right wall 21 of the indicator box 2. Another end 62 of pivotal support 6 extends through a hole 23 in the left wall 22 of the indicator box 2, and is supported by a supporter 27 of the box 2. Both ends 61, 62 are supported so that pivotal support 6 can rotate about its axis.

A lower end of a shaft 51 of shift lever 5 is fixed on a bracket 11 which is connected to pivotal support 6 by a pin 10. The shaft extends upwardly through a shaped guide hole 26 in upper face 25 of indicator box 2. At the top of the shaft 51 is attached a handle 52 preferably made of plastic. The shift lever 5 can be moved pivotably back and forth with respect to the automobile about the axis of pivotal support 6, i.e. from side to side in FIGS. 4 and 5. Shift lever 5 can also be moved from side to side with respect to the automobile about pin 10, i.e., in a plane parallel to the axis of pivotal support 6, under the control of a driver of the automobile.

A cable lever 63 is fixed to end 62 of pivotal support 6, and extends upwardly. The upper end 64 of cable lever 63 is connected to a cable 13 (see FIG. 1) which is also connected to an automatic transmission (not shown). Thus, when the shift lever 5 is operated and moved back and forth, cable lever 63 is also moved back and forth in responce to the movement of the shift lever 5, correspondingly changing the stroke of the cable 13. The gear shift of the automatic transmission is controlled in response to the stroke of the cable 13.

Figure 6:
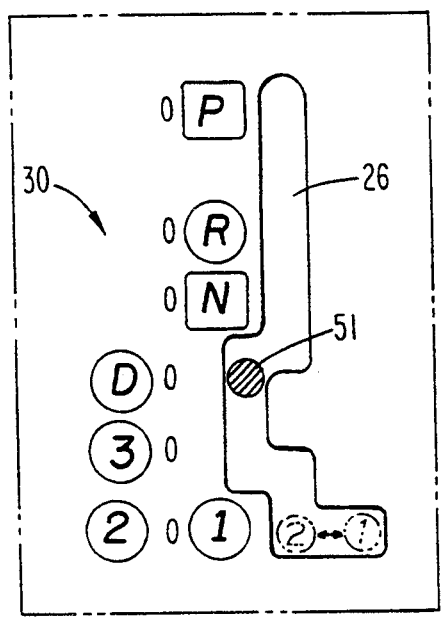
FIG. 6 is a plan view of part of the upper surface of the indicator.
Figure 7:
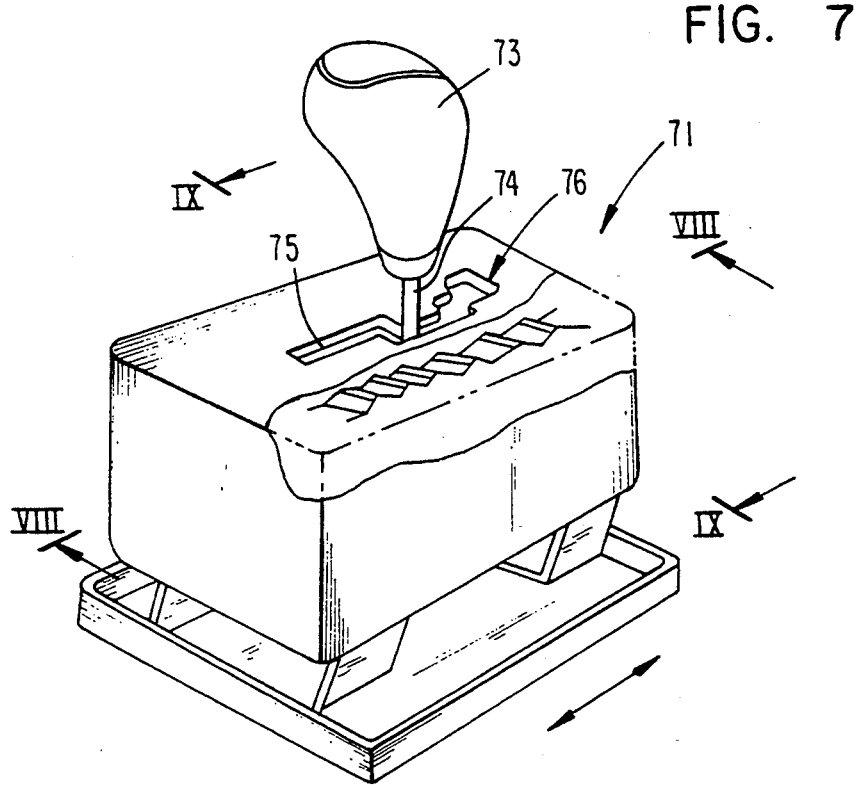
FIG. 7 is a view showing a shift device according to the second embodiment of the invention.
Figure 8:
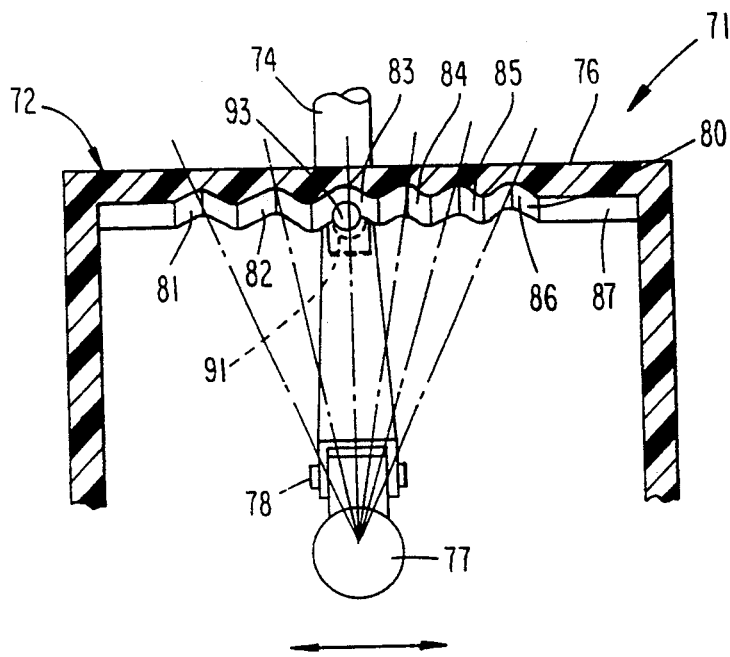
FIG. 8 is a side view, partly in section, of the shift device of FIG. 7.

An indicator 30 (best seen in FIG. 6) is provided on the upper face of 25 the indicator box 2. On the left side of guide hole 26, characters "P", "R", "N", "D", "3" and "2-1" are marked, as shown in FIG. 6, designating the following: "P" is a parking position, "R" is a reverse position, "N" is a neutral position, and "D" is a drive position. "3" is a position in which a four-speed automatic transmission can automatically select a gear from first to third, but not fourth. "2-1" is a position, in which the transmission can automatically select the first gear or the second gear when the shift lever 5 stays in the left position "2" and the first gear when the shift lever stays in the right position "1". Whether the shift lever stays right or left is sensed by a electrical switch (not shown) and corresponding signals are used for controlling the transmission.

Figure 5:
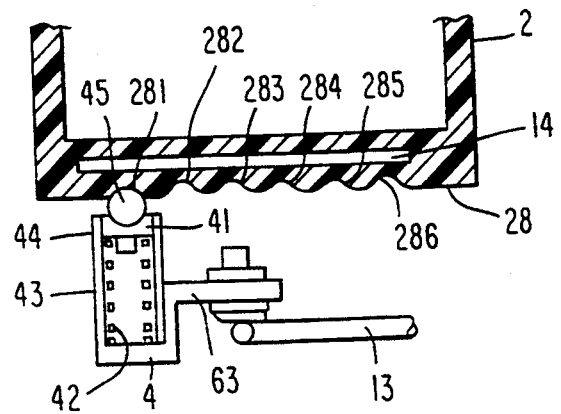
FIG. 5 is a plan view, partly in section, of the shift device.

On an outer side of the left wall 22 of the indicator box 2, as best seen in FIG. 5, there is provided a wavy surface 28 above the hole 23 to extend from rear to front. The wavy surface 28 has indents such as 281, 282, 283, 284, 285 and 286, which respectively correspond to shift positions "P", "R", "N", "D", "3" and "2-1" of the automatic transmission.

On the cable lever 63, a check ball device 4 is attached. See FIG. 5. The check ball device 4 includes a cylinder 43, a coil spring 42 inside, and a piston 41 located at the top 44 of the cylinder 43. Piston 41 moves back and forth inside the cylinder 43, along with a ball 45 placed on the piston 41. The ball 45 is thus held in resilient contact with the wavy surface 28, and usually rests at one of the indents 281, 282, 283, 284, 285, 286.

On the inner side of the left wall 22 of indicator box 2 is provided a depression 29 which has a step shape on its upper rim. One of the steps 291 corresponds to the shift position "P", and step 292 corresponds to the shift position "R". The positions "N", "D", "3" and "2-1" respectively correspond to the positions 293, 294, 295, 296 of the depression 29.

A position pin 7 is provided at the shaft 51 of the shift lever 5, and the position pin 7 is connected with a knob 31 of the handle 52 by a known linkage machine as shown in U.S. Pat. No. 5,044,221, so that the position pin 7 can be moved up and down in accordance with release or pushing down of the knob 31. When the knob 31 is pushed down, the position pin 7 is disengaged from one of the steps 291, 292 or the positions 293-296 of the depression 29. When the shift lever 5 is moved back and forth and/or left to right in the guide hole 26 the knob 31 is released, position pin 7 contacts one of the steps 291, 292 or the positions 293, 294, 295, 296.

Inside of the left wall 22, a steel plate 14 is inserted to reinforce the wall 22 so that the wall 22 has enough endurance against the side force applied from ball 45 biased by coil spring 42 and also against the upward force applied from the position pin 7 biased by a spring (not shown). The steel plate 14 is provided as to surround the depression 29.

When the shift lever 5 is operated to be moved back and forth, the cable lever 63 with check ball device 4 is also moved with respect to pivotal support 6. After one of the shift positions is selected, the position of the shift lever 5 is maintained by co-action between wavy surface 28 and the check ball device 4, and the shift 5 lever can stop at a position where the ball 45 meets with and engages one of the indents 281, 282, 283, 284, 285, 286.

In this embodiment of the invention, since the wavy surface 28 and the indicator 30 are provided on the same part, that is, on the indicator box 2, the shift lever 5 stops at the appropriate position of the indicator 30 when the shift lever 5 is released, as long as the indicator box 2 is so designed beforehand. Therefore, it does not take much time for a worker to adjust the position of the shift lever 5 against the indicator 30 at the automobile assembly line.

Figure 9:
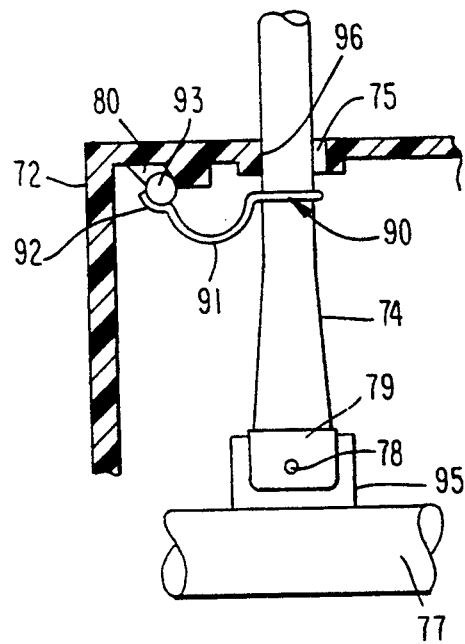
FIG. 9 is a rear view, partly in section, of the shift device of FIG. 7.
Figure 10:
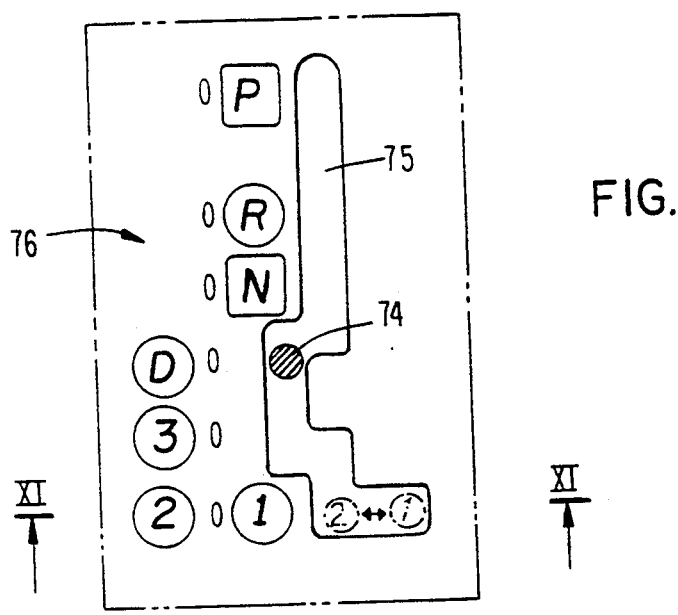
FIG. 10 is a plan view of the indicator of the shift device of FIG 7.

FIGS. 7-11 show a second embodiment of this invention. In this embodiment, the shift device 71 includes an indicating box 72, and a shift lever 73 the shaft 74 of which passes through a guide hole 75 of the indicating box 72. On the upper face of indicator box 71, there is provided an indicator 76 which indicates the shift position of the transmission. On the lower side 87 of the upper face of the indicator box 72, a wavy surface 80 is provided on the left side of the guide hole 75 and extends from rear to front. The wavy surface 80 has six indents 81, 82, 83, 84, 85, 86, each of which respectively corresponds to the shift positions "P", "R", "N", "D", "3" and "2-1". The face of the wavy surface 80 also slopes down from left to right as shown in FIG. 9.

The lower end 79 of shaft 74 is connected to a bracket 95 of an axle 77 by a pin 78 so that the shift lever 73 can be moved not only back and forth by pivoting about axis of axle 77, but also left to right. At the middle of the shaft 74, there is provided a check ball device 90 including a U-shaped spring 91 fixed to the shaft, and a ball 93 fixed to the free end 92 of the U-shaped spring 91. The U-shaped spring 91 resiliently pushes the ball 93 upward and also to the right to have the ball 93 make contact with the wavy surface 80. Because of the U-shaped spring 91, the shaft 74 maintains a resilient contact with the left rim 96 of the guide hole 75. The ball 93 fits one of the indents 81, 82, 83, 84, 85, 86, when one of the corresponding shift positions is selected.

Figure 11:
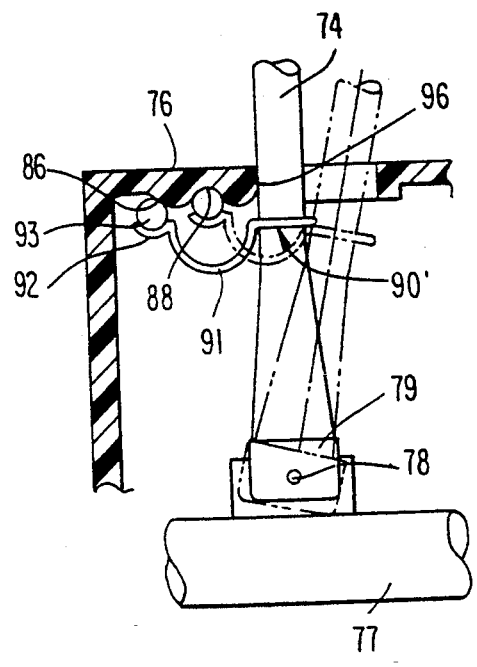
FIG. 11 is a rear view, partly in section at line XI—XI of FIG. 10, of the shift device of FIG. 7.
Figure 12:
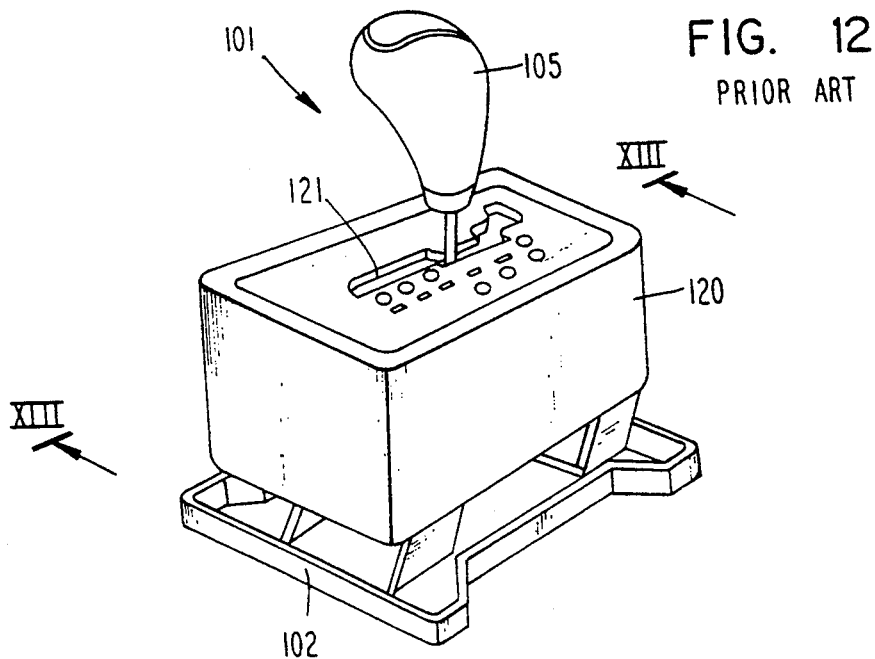
FIG. 12 is a view of a conventional shift device.
Figure 13:
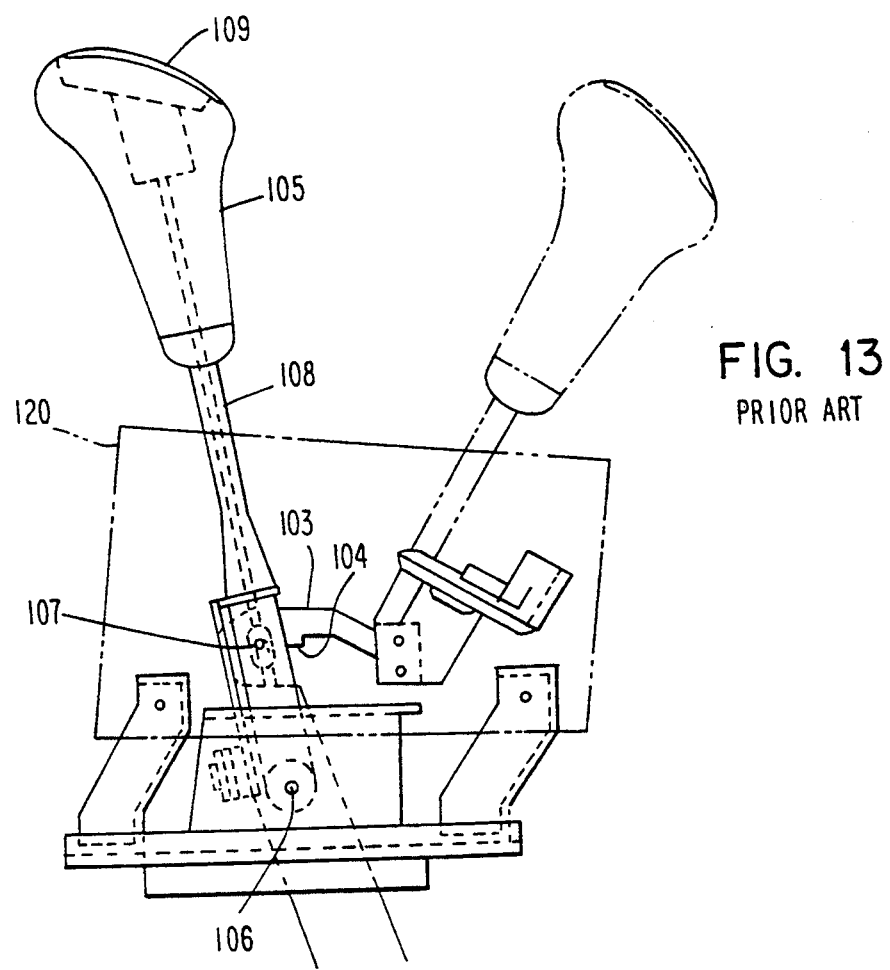
FIG. 13 is a vertical sectional view of the conventional shift device of FIG. 12 at section line XIII—XIII.

At the vertical cross-section of the "2-1" shift position, as best seen in FIG. 11, wavy surface 80 has another indent 88 just on the right side of the indent 86. The indents 86 and 88 are connected to each other with a smooth slope so that the ball 93 can move from the indent 86 to the indent 88 when the shift lever 73 is turned from left to right, that is, from the shift position "2" to "1".

The structure of the shift device 71 of this embodiment is otherwise the same as for the first embodiment, i.e., except for the wavy surface 80 of the indicator box 72 and the check ball device 90.

In the second embodiment of the invention, since the wavy surface 80 and the indicator 76 are provided on the same part, that is, on the indicator box 72, the shift lever 73 stops at the appropriate position of the indicator 76 when it is released, as long as the indicator box 72 is so designed beforehand. Therefore, it does not take much time for a worker to adjust the position of the shift lever 73 against the indicator 76 at the automobile assembly line.

Furthermore, since the shaft 74 is forced to maintain contact with the rim 96 by the U-shaped spring 91 while the automobile is driven, no noise is made by any collision of the shaft 74 against the rim 96.

The foregoing description of preferred embodiments for the purpose of illustrating this invention is not to be considered as limiting or restricting the invention, since many modifications may be made by those skilled in the art without departing from the invention.

We claim:

1. A shift device for an automatic transmission of an automobile, comprising:
   an indicator box fixed to a floor of the automobile, said indicator box including an upper portion having an undersurface provided with a wavy surface comprising a plurality of indents;

an axle extending horizontally across and rotatably supported by said indicator box;

a shift lever movable back and forth by pivoting around an axis of said axle as moved by an operator of the automobile; and check ball means for positioning said shift lever with respect to the indicator box, supported by said axle and held resiliently in contact with said wavy surface of said indicator box, said check ball means moving back and forth by pivoting around said axis in correspondence with motions of said shift lever.

2. A shift device for an automatic transmission of an automobile, comprising:

an indicator box fixed to a floor of the automobile, said indicator box including a portion having a wavy surface comprising a plurality of indents;

an axle extending horizontally across and rotatably supported by said indicator box;

a shift lever which is movable back and forth by pivoting around an axis of said axle as moved by an operator of the automobile; and check ball means for positioning said shift lever with respect to the indicator box, supported by said axle and held resiliently in contact with said wavy surface of said indicator box, said check ball means moving back and forth by pivoting around said axis in correspondence with motions of said shift lever, wherein a first end of said axle is supported by a side wall of said indicator box, said axle extending through the other side wall of said indicator box, so that a second end of the axle is rotatably supported by a supporter provided outside of said side wall so that the axle can be moved in rotation about said axis.

3. A shift device as set forth in claim 2, further comprising:

a cable lever connected to an end of said axle, on which said check ball means is fixed.

4. A shift device as set forth in claim 2, wherein:

said shift lever can be moved from side to side with respect to said indicator box in a plane parallel to the axis of said axle.

5. A shift device as set forth in claim 2, wherein:

said wavy surface is provided on the lower side of an upper face of said indicator box, said indents of wavy surface being disposed in a direction oriented from rear to front with respect to said indicator box wherein said check ball device includes a spring which is fixed on said shift lever in said indicator box, and a ball supported by a free end of said spring and disposed to fit to a selected one of indents of said wavy surface to be held resiliently in contact with said wavy surface, whereby said shift lever is forced to one side and stops moving when said ball fits to said selected indent.

6. A shift device as set forth in claim 2, further comprising:

a depression a an inner side of said other side wall of said indicator box; and a position pin supported by said shift lever, one end of said position pin going into and out of said depression in correspondence with a movement of the shift lever from side to side, wherein said indents of said wavy surface are provided so that each of said indents corresponds to a respective position where said position pin can stop.

7. A shift device a set forth in claim 1, wherein:

said wavy surface is provided on the lower side of an upper face of said indicator box, said indents of wavy surface being disposed in a direction oriented from rear to front with respect to said indicator box.

8. A shift device as set forth in claim 7, wherein:

said wavy surface also comprises a face sloping in a direction oriented from said to side with respect to said indicator box.

* * * * *

UNITED STATES PATENT AND TRADEMARK OFFICE
CERTIFICATE OF CORRECTION

PATENT NO. : 5,339,705
DATED : August 23, 1994
INVENTOR(S) : Katsunori SHIRAHAMA et al.

It is certified that error appears in the above-indentified patent and that said Letters Patent is hereby corrected as shown below:

Column 6, line 38, change "said" to --side--.

Signed and Sealed this

Thirty-first Day of January, 1995

Attest:

BRUCE LEHMAN

Attesting Officer     Commissioner of Patents and Trademarks